United States Patent [19]

Tokuno

[11] Patent Number: 4,638,642

[45] Date of Patent: Jan. 27, 1987

[54] HEAT PUMP

[75] Inventor: Sanji Tokuno, Hofu, Japan

[73] Assignee: Kyowa Hakko Kogyo Co., Ltd., Tokyo, Japan

[21] Appl. No.: 689,805

[22] Filed: Jan. 8, 1985

[30] Foreign Application Priority Data

Jan. 10, 1984 [JP] Japan .................................. 59-2273

[51] Int. Cl.⁴ ............................................. F25B 1/00
[52] U.S. Cl. ....................................... 62/498; 62/268; 62/467
[58] Field of Search .................. 62/100, 114, 116, 500, 62/268, 467, 498, 115

[56] References Cited

U.S. PATENT DOCUMENTS

| | | | |
|---|---|---|---|
| 1,783,464 | 12/1930 | Follain | 62/500 |
| 1,889,191 | 11/1932 | Baumann | 62/500 |
| 2,049,946 | 8/1936 | Chistofferson | 62/500 |
| 2,064,609 | 12/1936 | Humble | 62/100 |
| 2,512,869 | 6/1950 | McBroom | 62/500 |
| 2,513,361 | 7/1950 | Rausch | 62/116 |
| 4,484,457 | 11/1984 | Mugele | 62/500 |

*Primary Examiner*—Ronald C. Capossela
*Attorney, Agent, or Firm*—Antonelli, Terry & Wands

[57] ABSTRACT

A heat pump using water as a refrigerant comprises an evaporator equipped with a feedwater control device and a draining device, a compressor and a condenser equipped with a vacuum generating means.

9 Claims, 1 Drawing Figure

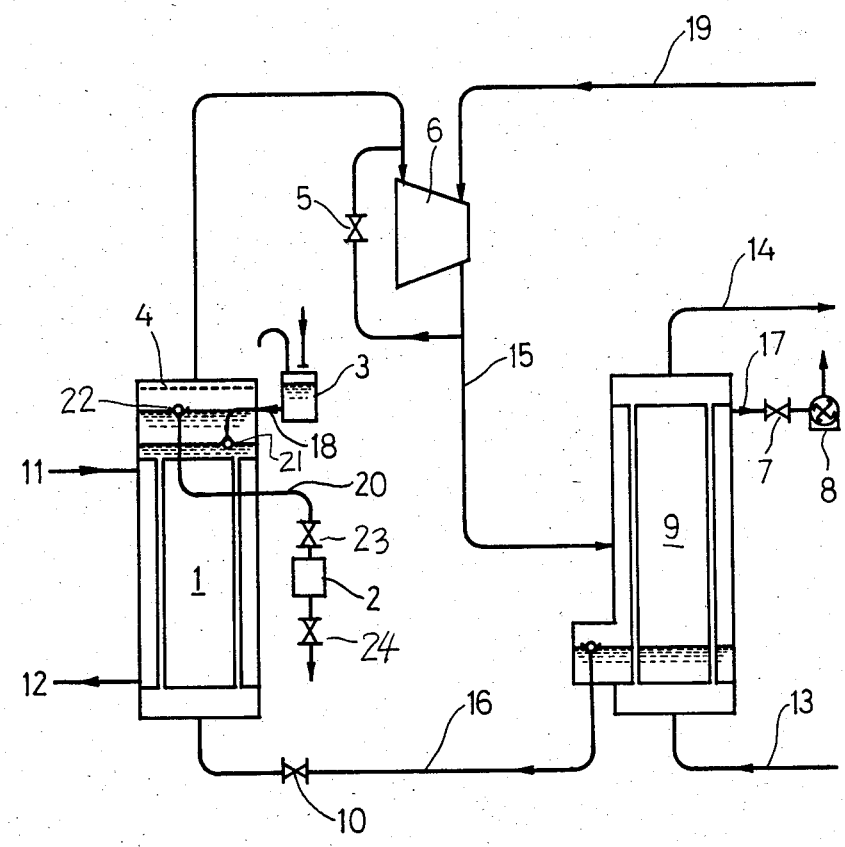

HEAT PUMP

This invention relates to an improved mechanical compression type heat pump.

A so-called Freon-type refrigerant is generally used in the conventional mechanical compression type heat pump. However, when Freon-type refrigerant is used for a long period under medium or high temperatures, the refrigerant is decomposed into HCl, HF, etc. If water is introduced into the pump, the pump will be damaged by corrosion. Furthermore, since the whole system is operated under high pressure, a refrigerant leak brings problems of toxicity, danger, and corrosion for some kinds of refrigerant. Jobs such as regular and irregular supplying of a refrigerant, collection of a refrigerant at the time of repair and overhaul, and refilling of a refrigerant are troublesome. Also, the price of a refrigerant itself is expensive.

An improved type heat pump, which uses water as a refrigerant, was produced as a result of various studies of improving the above disadvantages. It was found that the heat pump can be operated under pressures below atmospheric pressure.

When water is used as a refrigerant, the following three combinations of pressure at the suction and discharge sides of the compressor exist depending on the temperature conditions:

1. The pressure at both suction and discharge sides of the compressor is above atmospheric pressure.
2. The pressure at the suction side is below atmospheric pressure, while the pressure at the discharge side is above atmospheric pressure.
3. The pressure at both suction and discharge sides is below atmospheric pressure.

It is impossible to prevent air from entering into the heat pump system when the pressure is below atmospheric pressure at the suction side or at both suction and discharge sides.

In the case where the pressure is below atmospheric pressure at only the suction side, while the pressure is above atmospheric pressure at the discharge side, an uncondensed gas (air) is purged from the upper portion of the condenser.

In the case where the pressure at both suction and discharge sides is below atmospheric pressure, the uncondensed gas is exhausted from the condenser by continuous or intermittent suction using a vacuum generating apparatus such as an ejector or vacuum pump and a vacuum is maintained as a result.

Water or steam, which exert no effect if they enter, is used as sealing liquid or sealing gas at the seal portion (gland seal, mechanical seal, labyrinth seal, etc.) of the compressor in order to limit entering air as far as possible.

The quantity of water as a refrigerant in the system is reduced by purges or exhaustion with a vacuum generating apparatus. As a preventive measure, to keep the water levels in the evaporator and condenser constant, water is supplied automatically or manually by a pressurized or unpressurized feedwater device.

On the contrary, the water level in the system is increased when the quantity of water or steam entering the system exceeds the quantity discharged from the system.

To prevent this, an overflow pipe, double valves, or a suction device is used to drain excessive water and keep the water level in the evaporator and condenser constant.

In this case, when draining is done automatically, the drain level should be higher than the level at which the feedwater device starts operation.

The load regulation of the heat pump is done by the adjustment of the compressor's bypass valve, adjustment of the inlet valve opening angle, or control of the number of revolutions.

The heat pump according to the present invention comprises a vacuum generating apparatus, a feedwater device, and a draining device, in addition to an evaporator, a compressor, a condenser and a pressure reducing valve which are conventional elements of a heat pump.

The vacuum generating apparatus exhausts uncondensed gas which leaks into the heat pump system, the feedwater device supplies water to compensate for decreased amounts of water in the heat pump, and the draining device drains excessive water from the heat pump system.

The present invention has the following advanages:
(1) There is no fear of decomposition of refrigerant and change in quality, because water is used as a refrigerant, and this fact enables the heat pump to be operated over a wide temperature range.
(2) In the case of a leak, there is no problem with regard to toxicity, danger or corrosion.
(3) Feeding and draining of refrigerant are easy.
(4) The refrigerant is inexpensive.
(5) As the portions which contact the refrigerant or gas, inexpensive materials such as cast iron and structural steel are used.
(6) Since the refrigerant is water, water and steam can be used for sealing at the seal portion of compressor which enhances the degree of seal tightness of the system.
(7) Operation and maintenance are easy.
(8) In the case where operation is carried out under pressures below atmospheric pressure, there is no leakage of water into the heat source fluid or the heated fluid. Therefore, the system lends itself to applications in the fields of food, medical compounds, etc.

Embodiments of the present invention are described with reference to the accompanying drawing wherein:

The FIGURE illustrates schematically the arrangement of the elements comprising the heat pump.

The FIGURE shows the heat pump, operated at a low or medium temperature; e.g., 10° to 95° C., in which both evaporation and condensation of water is performed under a pressure less than atmospheric pressure; e.g., 0.18 to 12.3 psi. Heat source fluid, e.g., methanol vapor, enters from inlet 11 and condensed methanol exits from outlet 12, heating water flows in the evaporator 1. Fluid to be heated, e.g., ethanol, enters from inlet 13, is heated with steam which is condensed in the condenser 9, and exits via conduit 14. Water flowing in the heat pump evaporates while cooling or condensing the heat source fluid in the evaporator and flows into compressor 6 after mist is removed by demister 4. Steam pressurized by compressor 6, temperature of which is raised, passes through pipe 15 and enters condenser 9.

Steam itself turns to condensed water by giving heat to the heated fluid in the condenser. This water flows into the evaporator 1 through pipe 16. At the end of pipe 16 in the condenser 9, the attached float valve keeps the water level in the condenser constant. The pressure reducing valve 10 is attached to the pipe 16 between the evaporator 1 and condenser 9 to maintain the required pressure difference. Since the whole system is operated below atmospheric pressure, air which enters into the system is exhausted from the top of condenser 9 through pipe 17 by vacuum generating device 8 and is discharged into the atmosphere.

The vacuum regulation valve 7, provided half way long pipe 17, keeps condensing pressure to the required value; e.g. 0.23 to 14.2 psi. Steam is discharged from the system along with uncondensed gas, so supplementation of water becomes necessary. This supplementation of water is effected by feedwater device 3 through pipe 18.

The float valve 21, attached at the end of pipe 18 located in the evaporator 1, enables the water level in the evaporator to be the required level. Pipe 19 is a steam line for sealing of a seal portion of the compressor (labyrinth type). This steam flows into condenser 9 through pipe 18 along with compressed steam and further flows into evaporator 1 through pipe 16 in the form of condensed water. In the case where the quantity of steam entering into the system exceeds the quantity which is discharged by vacuum generating equipment 8, the level of water in the evaporator goes up. In this case, extra water is drained through pipe 20 by draining device 2.

In the case of manual-double valve type operation, excessive water is guided to a receiving pot 2 in the draining device through a float valve 22, which is connected to pipe 20 in the evaporator, holding the upper valve 23 of the draining device open. The upper valve is closed when the receiving pot is filled with water and then water is discharged by opening the lower valve 24. The load regulation of the heat pump is performed by bypass valve 5.

What is claimed is:

1. A heat pump operated below atmospheric pressure, said pump comprising an evaporator, a compressor and a condenser and conduit means for connecting the evaporator, the compressor and the condenser, successively, in fluid communication with each other and for providing a flow of refrigerant therethrough; said refrigerant being water, said evaporator being equipped with a feed water control device and a draining device for maintaining a liquid level of water refrigerant within a predetermined range in said evaporator and said condenser being equipped with a vacuum generating means for maintaining a vacuum within said condenser; said compressor withdrawing heated vapor from said evaporator via said conduit means at below atmospheric pressure, compressing the heated vapor, and directing the resulting pressurized vapor into the condenser.

2. The heat pump according to claim 1, wherein said vacuum generating means exhausts uncondensed air which leaks into the heat pump via the condenser.

3. The heat pump according to claim 1, wherein the feedwater device includes means for supplying water to compensate for a decrease in the amount of water within the heat pump.

4. The heat pump according to claim 3, wherein the feedwater device includes a float valve which is actuated when the water level in the evaporator falls below a set level.

5. The heat pump according to claim 1, wherein the draining device includes a liquid level actuated means for draining excessive water from the evaporator of the liquid level estimated means of the heat pump.

6. The heat pump according to claim 5, wherein the draining device includes a float valve which is actuated when the water in the evaporator exceeds a predetermined level.

7. The heat pump according to claim 1, wherein said evaporator includes an inlet means and an outlet means for directing a heat source fluid into and out of a heat exchanger unit located within said evaporator.

8. The heat pump according to claim 1, wherein said condenser includes inlet means and outlet means for directing a fluid to be heated into and out of a heat exchanger unit located within said condenser.

9. The heat pump according to claim 1, wherein water condensed in said condenser is directed via said conduit means via a pressure reduction valve into said evaporator whereby a closed-loop cycle of refrigerant is provided for said heat pump.

* * * * *